Sept. 2, 1958 J. O. CREEK 2,849,788
METHOD AND APPARATUS FOR MAKING HOLLOW BLADES
Filed Aug. 2, 1952 3 Sheets-Sheet 1

INVENTOR
J. O. CREEK
PER

ATTORNEY

Sept. 2, 1958  J. O. CREEK  2,849,788
METHOD AND APPARATUS FOR MAKING HOLLOW BLADES
Filed Aug. 2, 1952  3 Sheets—Sheet 3

INVENTOR
J. O. CREEK
PER

ATTORNEY.

United States Patent Office
2,849,788
Patented Sept. 2, 1958

2,849,788

METHOD AND APPARATUS FOR MAKING HOLLOW BLADES

John Oliver Creek, Brampton, Ontario, Canada, assignor to A. V. Roe Canada Limited, Malton, Ontario, Canada, a corporation Application August 2, 1952, Serial No. 302,336

10 Claims. (Cl. 29—156.8)

This invention relates to the manufacture of hollow objects and in particular to the manufacture of hollow blades for gas turbine engines.

In modern gas turbine engines employing high rotational speeds, of the order of 6000 R. P. M., the centrifugal loading imposed in the blade root of a solid blade is approximately 9500 lb. at the first stage of a rotary compressor, the total loading on the rotor disc for the first stage amounting to about 145 tons. The attendant problems in blade and rotor design are usually met by increasing root and disc rim areas in order to keep stresses at a reasonable figure, but such increases in area are accompanied by proportional increases in weight.

It has been found that by the use of hollow blading the root and rim loading may be reduced by approximately 50%. Also the weight of a complete compressor is reduced by about 150 lb., which is a weight saving of 20% to 25%.

Previously known methods of manufacturing hollow blades possessing adequate physical properties have not been readily adaptable to mass production. The use of materials which are not easily worked and the demand for extreme accuracy has necessitated the frequent replacement of expensive dies, whether forging or extrusion methods have been employed. It is therefore an object of the invention to provide an improved method and apparatus for the quantity manufacture of hollow blades and similar objects.

It is another object of the invention to provide a method and apparatus for flattening to a desired configuration a hollow workpiece having a closed end without subjecting the material of the workpiece adjacent the closed end to excessive compression.

Other objects and advantages will become apparent during the course of the following description of the invention applied to the manufacture of blading for gas turbine engines.

In the accompanying drawings, forming a part of this specification, and in which like reference characters are employed to designate like parts throughout the several views:

Fig. 1 shows a machined blank 11 from which a hollow blade can be formed. It is important that the volume of the blank correspond to the calculated volume of the extrusion at the forming operation shown in Fig. 6.

Figure 2:
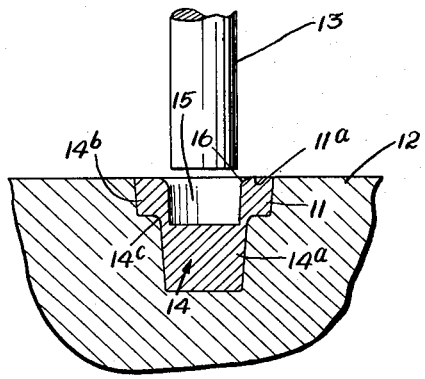
Fig. 2 is a fragmentary sectional view of an impact extrusion die and punch before an extrusion operation, showing the blank of Fig. 1 in place in the die cavity.
Figure 1:
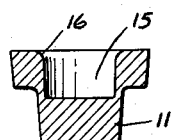
Fig. 1 is a sectional view of a machined blank from which a hollow blade is to be made.

The blank 11 is adapted to fit, at extrusion temperature, in an impact extrusion die 12 shown with its associated punch 13 in Fig. 2. The die has a cavity 14 made up of an interior portion 14a and a mouth portion 14b, both of which are co-axial with the punch and are of inverted frusto-conical form, the major diameter of the interior portion 14a being smaller than the coplanar minor diameter of the mouth portion 14b. The upper edge 14c of the interior portion 14a is rounded. The blank 11 is povided with a cavity 15 of inverted frusto-conical form, having a minor diameter smaller than the major diameter of the interior portion 14a of the die cavity and a major diameter smaller than the major diameter of the mouth portion 14b. The cavity 15 is co-axial with the interior portion 14a and the mouth portion 14b of the die 12 and is slightly deeper than the mouth portion 14b. At its major diameter the wall of the cavity 15 is blended into the face 11a by a substantial radius 16.

Figure 3:
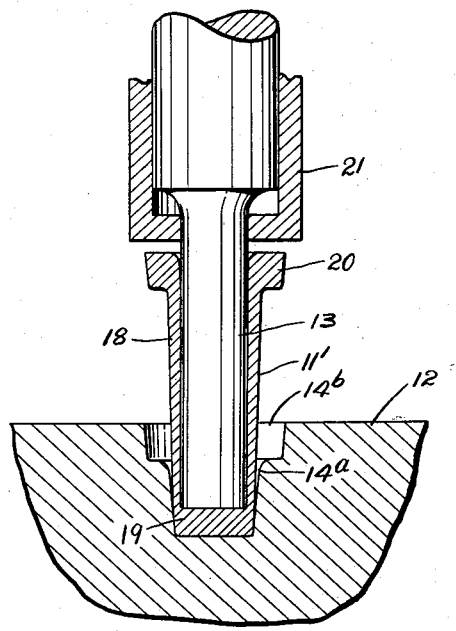
Fig. 3 is a fragmentary sectional view of the impact extrusion die and punch, showing an extrusion after it has been formed from the blank of Figs. 1 and 2 but before it is stripped from the punch.

In the impact extrusion operation the cylindrical punch 13, having a diameter substantially equal to the minor diameter of the cavity 15, is centered accurately in the cavity in the blank and the punch is then rapidly lowered into the die, the blank becoming the extrusion 11' shown in Figure 3. The radial distance between the lower end of the punch 13 and the walls of the die 12 is small, to facilitate extrusion of the blank. The extrusion 11' consists of a substantially cylindrical shell 18 sheathing the punch 13 and closed at one end by a relatively thick frusto-conical portion 19; at its open end the extrusion has a heavy collar 20 which formerly occupied the mouth portion 14b of the die. During the extrusion operation, as the punch 13 descends into the die the annular throat between the end of the punch and the frusto-conical wall of the interior portion 14a of the cavity in the die progressively decreases, since the diameter of the die diminishes progressively in the sense of travel of the punch, and the outer surface of the resulting shell 18 is tapered toward the closed end, the inner surface of the shell, which is in contact with the punch, being cylindrical. After the extrusion 11' has been formed, the punch is withdrawn from the die 12 and a stripper 21 removes the extrusion from the punch.

Figure 4:
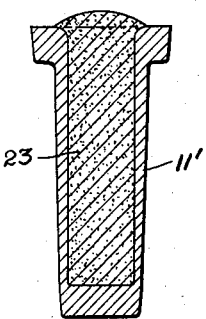
Fig. 4 is a sectional view of the extrusion shown in Fig. 3, the extrusion having been stripped off the punch and filled with a filler material.

After the extrusion 11' has cooled it is filled with a substantially incompressible but deformable material having a relatively low melting point. This filler material forms a core 23, as shown in Fig. 4. Factors such as the wall thickness of the shell 18 and the composition of the extrusion 11' influence the choice of core material, but such materials as Wood's metal, lead, lead bismuth alloys and even silicone or rubber-like plastics may be used satisfactorily. For high quantity production it is advantageous to precast cores 23 of the chosen material, to be inserted ready formed into the cavity in the extrusion 11'.

Figure 5:
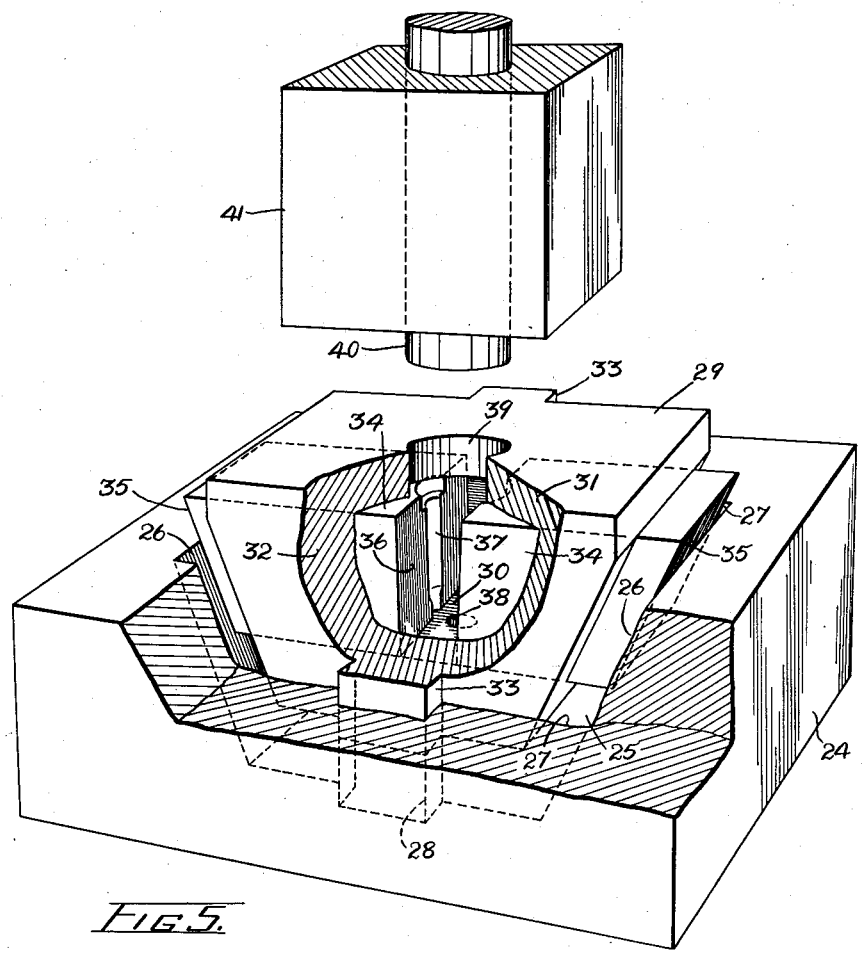
Fig. 5 is a broken away perspective view, to a reduced scale, of a pressure die assembly showing the dies withdrawn for the insertion of the extrusion shown in Fig. 4.

The die assembly used for reducing the extrusion to aerofoil form is shown in Fig. 5. The die assembly consists of a bed 24 surrounding a prismoidal hole 25 having opposed inclined walls 26 and opposed vertical walls 27. Vertical grooves 28 are provided in the walls 27. The hole 25 accommodates a shroud or holder 29 which is a thick-walled box-like structure having a base 30, a top 31 and opposed vertical side walls 32. The side walls 32 are formed with external guides 33 which slidably engage the grooves 28, locating the shroud horizontally while giving it freedom of vertical movement within the hole 25. The ends of the shroud adjacent the inclined walls 26 are open and accommodate slidable die blocks 34 each having a face 35 in engagement with one of the inclined walls 26 and a die face 36 in which is sunk a cavity 37; the cavities 37, when the die faces 36 are in contact, define the aerofoil form of the blade which is to be made from the extrusion 11'.

A tapered hole or recess 38 is centrally located in the base 30 of the die shroud 29, and a hole 39 is provided in the top 31 to act as a guide for a cylindrical ram 40. The holes 38 and 39 are coaxial with the axis of the aerofoil blade form as defined by the cavities 37. Coaxial with the ram 40 is another ram 41 adapted to bear upon the top 31 of the die shroud 29.

Figure 6:
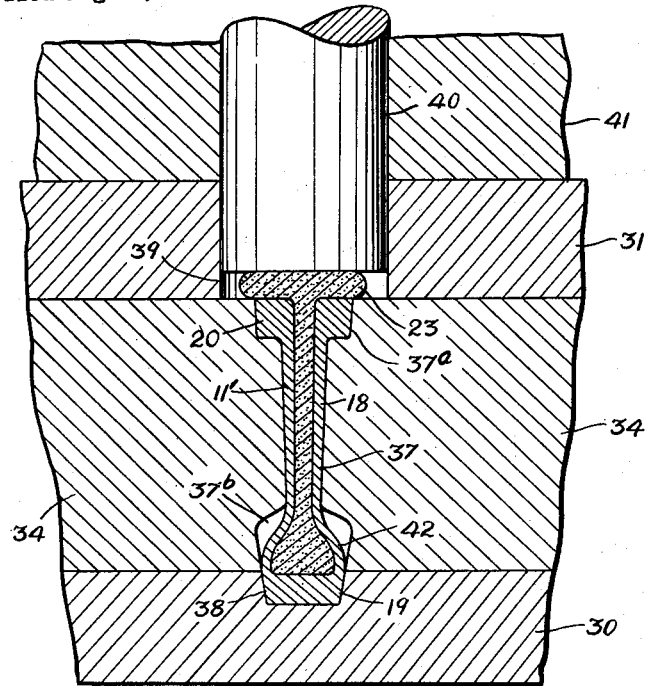
Fig. 6 is a fragmentary sectional view of the assembly shown in Fig. 5, showing the dies closed upon the extrusion.

The extrusion 11' is inserted through the hole 39 so that the frusto-conical end portion 19 of the extrusion seats in the recess 38. The rams 40 and 41 are then lowered, the ram 40 entering the hole 39 and being guided thereby to rest upon the upper end of the core-filled extrusion 11'; the pressure exerted by this ram 40 is not very great but is sufficient to control the behaviour of the core 23 as will be explained hereinunder. The ram 41 engages the top 31 of the shroud 29 and forces it downwardly into the hole 25; by the interaction of the inclined walls 26 and 35, depression of the shroud 29 causes the die blocks 34 to move towards each other and to close upon the extrusion 11'. The guides 33 in the grooves 28 ensure accurate centring of the dies in relation to the shroud. Continued application of the ram 41 causes the extrusion 11' to deform under the lateral pressure of the die blocks 34 until it assumes a substantially aerofoil shape when the die faces 36 come together, as shown in section in Fig. 6. Simultaneously the core is extruded into the opening 39 the walls of which constitute retaining means for receiving the extruded core, the ram 40 sealing the retaining means and the rate of extrusion being controlled by the pressure exerted by the ram, the said pressure being just sufficient to prevent uneven collapse of the thin shell 18 of the extrusion 11' as it is compressed laterally.

Figure 8:
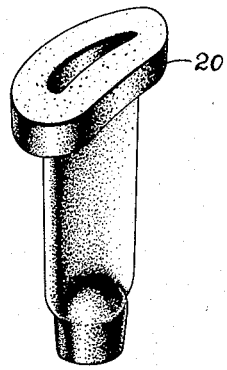
Fig. 8 is a perspective view of the extrusion after it is removed from the pressure die assembly and after the filler material is removed.

At their upper ends the cavities 37 have recesses 37a which receive the collar 20 and the collar is formed by the compressive process into the shape illustrated in Fig. 8. At their lower ends the cavities provide recesses 37b in which a bulb 42 is formed in the lower end of the extrusion 11', the remainder of the shell 18 being compressed by the closing of the die blocks. Since the recesses 37b permit the formation of the bulb 42, undue compression and consequent buckling or crumpling of the extrusion adjacent its closed lower end is prevented. The base 30 and die blocks 34, with their recesses 38 and 37b, define a closed chamber in which the closed end of the workpiece is located.

Figure 7:
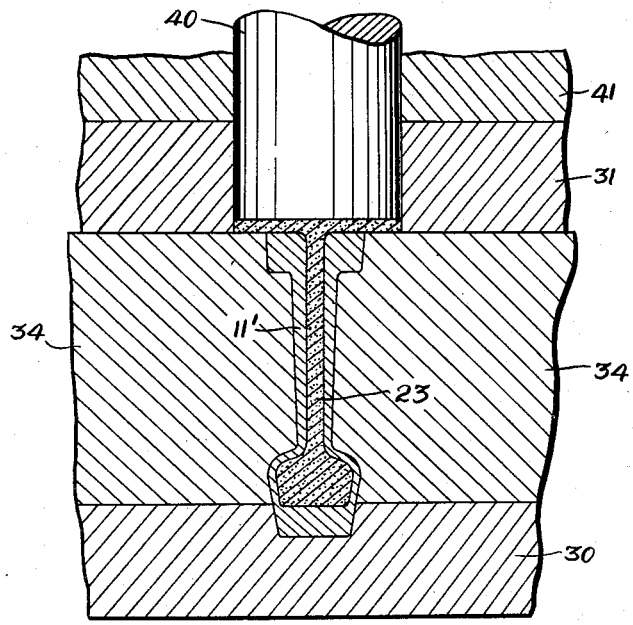
Fig. 7 is a fragmentary sectional view similar to Fig. 6 showing the application of pressure to the filler material to stretch the extrusion to conform to the cavities in the dies.

In the next operation, which is illustrated in Fig. 7, the ram 41 is maintained in lowered position to hold the die blocks 34 stationary in closed position, thus preserving the dimensions of the chamber in which the lower end of the workpiece is located, and the ram 40 is forcibly lowered upon the extruded core 23 driving it back into the cavity of the extrusion 11'. Since the die faces 36 are held in contact with each other by the continued pressure of the ram 41, the material of the extrusion 11' is forced by the pressure of the core to conform closely to the form of the cavities 37; the bulb 42 expands, filling the recesses 37b, and along the legnth of the extrusion the material is forced into the portions of the cavities 37 that define the leading and trailing edges of the blade. Thus there is cold working of the material of the extrusion, producing beneficial effects upon the physical properties of the material in addition to ensuring its close conformity to the desired shape. The dimensions of the shell 18 after impact extrusion, and of the recesses 37a, are predetermined empirically to ensure that the material of the extrusion is stretched beyond its elastic limit but not beyond its yield point, the stretch allowance being of the order of 5% to 10% for both longitudinal and transverse direction.

After removal from the die assembly the extrusion 11' is heated to remove the core 23 and the extrusion then has the appearance illustrated in Fig. 8. To finish the extrusion into a blade, the bulb 42 is removed and the collar 20 is machined externally to form the root of the finished blade.

The problem of the manufacture and replacement of dies is always serious in the forging or extrusion of complicated shapes. Those skilled in the art will recognize that the method of manufacture and the apparatus described herein simplify this problem. The die 12, which is the only die subjected to hard wear and likely to require frequent replacement, has a simple circular cavity 14 and is relatively easy to manufacture. On the other hand the more exacting and expensive dies 34, which must have highly finished cavities 37 conforming accurately to the contour of the finished blade, are not called upon to operate under hammer blows or at elevated temperatures and therefore require infrequent replacement.

The method and apparatus herein disclosed are not limited to any particular blade material, nor are they applicable only to the formation of blades of gas turbine engines. They may be used advantageously in the manufacture of any thin-shelled objects, particularly where cold working is required to improve the physical properties of the material.

In some instances the production rate may be increased by the use of a forging for the blank 11, in which case the relatively costly machining operation is eliminated, and blades are produced rapidly and in large quantities in a forging die which can be used in the subsequent impact extrusion operation to hold the blanks while the blanks are being extruded.

It is therefore to be understood that the form of the invention herewith shown and described is to be taken as a preferred example of the same, and various changes in procedure and in the shape, size and arrangement of parts may be resorted to without departing from the spirit of the invention or the scope of the subjoined claims.

What I claim as my invention is:

1. The method of forming a hollow blade-like object from a tube having a closed end and an open end, comprising introducing a substantially incompressible deformable medium within the tube, flattening the tube by subjecting opposite sides of the tube to external pressure between dies thereby forcing the sides closer together and extruding the deformable medium from the open end, but providing relief of external pressure adjacent the closed end of the tube thus leaving the closed end relatively unflattened so that excessive compression of the material of the workpiece adjacent the closed end is prevented, controling the rate of extrusion of the deformable medium, and, with the external pressure still being applied at the sides, forcing at least part of the exruded medium back into the tube thereby expanding the closed end and stretching the material of the workpiece adjacent the closed end beyond its elastic limit to conform to the shape of the dies.

2. The method claimed in claim 1, wherein the rate of extrusion of the deformable medium is controlled by applying pressure to it as it is extruded, and wherein at least part of the extruded medium is forced back into the tube by increasing the pressure applied to it.

3. The method claimed in claim 2, wherein the operations of flattening the workpiece and stretching the material of the workpiece adjacent the closed end are carried out at room temperature.

4. The method claimed in claim 3, wherein after the expansion of the closed end it is removed from the workpiece.

5. The method of forming a hollow blade-like object from a tube having a closed end and an open end, comprising introducing a substantially incompressible deformable medium within the tube, flattening the tube and extruding the deformable medium from the open end by closing together a pair of dies at opposite sides of the tube with the closed end of the tube adjacent a recess in at least one of the dies, the dies forcing the opposite sides of the tube closer together and the recess leaving the closed end relatively unflattened thereby preventing excessive compression of the material of the tube adjacent the closed end, controlling the rate of extrusion of the deformable medium by control of pressure means adjacent the open end of the tube, and, with the dies closed together, forcing the deformable medium into the closed end of the tube by pressure of the pressure means thereby expanding the closed end to conform to the shape of the recess and stretching the material of the workpiece adjacent the closed end beyond its elastic limit.

6. The method claimed in claim 5, wherein, after the stretching of the material of the workpiece adjacent the closed end, the expanded closed end is removed from the workpiece.

7. The method claimed in claim 5, wherein the flattening of the workpiece and stretching of the material of the workpiece is done without prior heating of the workpiece.

8. The method claimed in claim 7, wherein, after the stretching of the material of the workpiece adjacent the closed end, the expanded closed end is removed from the workpiece.

9. Apparatus for deforming a hollow workpiece having a closed end and an open end, comprising die means having a holder provided with a recess for receiving part of the closed end to position the workpiece, the die means also having a pair of dies slidable towards each other on the holder, means for sliding the dies towards each other for forcing opposite sides of the workpiece closer together, at least one of the dies having a recess for location adjacent the closed end of the workpiece for receiving the closed end as the dies are closed together so that excessive compression of the material of the workpiece at the closed end is prevented, the holder and dies when the dies are closed defining with said recesses a chamber in which the closed end of the workpiece is located, means for maintaining the holder and dies stationary after the dies are closed to preserve the dimensions of said chamber, and means for forcing a deformable medium into the closed end of the workpiece while the dimension of said chamber are so preserved to stretch the material of the workpiece at the closed end beyond its elastic limit to conform to the shape of said chamber.

10. Apparatus for deforming a hollow workpiece having a closed end and an open end and containing a substantially incompressible deformable medium, comprising a bed having spaced apart downwardly converging side walls, a shroud movable downwardly in the bed between the converging side walls, the shroud having a substantially horizontal top wall and base and the base having a recess for receiving part of the closed end of the workpiece to position the workpiece, a pair of die blocks slidably movable horizontally in the shroud on said base and in contact with said top wall and having faces engageable with the converging side walls of the bed so that the die blocks slide towards each other in the shroud when the shroud moves downwardly, the die blocks having opposed die faces which close together on the workpiece when the die blocks slide towards each other, thus forcing opposite sides of the workpiece closer together and extruding the deformable medium from the open end of the workpiece, at least one of the die faces having a recess for location adjacent the closed end of the workpiece for receiving the closed end as the die faces are closed together so that excessive compression of the material of the workpiece at the closed end is prevented, said base and said dies when the dies are closed defining with said recesses a chamber in which the closed end of the workpiece is located, means for holding the shroud and dies stationary after the dies are closed to preserve the dimensions of said chamber, said top wall having an opening for receiving the extruded deformable medium from the open end of the workpiece, and a movable ram sealing said opening and movable away from the open end of the workpiece during closure of the die faces to control the extrusion of the deformable medium, the ram being movable towards the open end while the dimensions of said chamber are so preserved to force the extruded medium into the workpiece to stretch the material of the workpiece at the closed end beyond its elastic limit to conform to the shape of said chamber.

References Cited in the file of this patent

UNITED STATES PATENTS

| | | |
|---|---|---|
| 453,410 | Langerfeld | June 2, 1891 |
| 482,837 | Abell | Sept. 20, 1892 |
| 1,338,462 | Rydbeck | Apr. 27, 1920 |
| 1,766,098 | Booth | June 24, 1930 |
| 1,802,843 | Singer | Apr. 28, 1931 |
| 1,921,188 | Ireland | Aug. 8, 1933 |
| 1,925,854 | Squires | Sept. 5, 1933 |
| 1,927,247 | Squires | Sept. 19, 1933 |
| 2,047,296 | Squires | July 14, 1936 |
| 2,070,589 | Giacchino | Feb. 16, 1937 |
| 2,168,641 | Arbogast | Aug. 8, 1939 |
| 2,202,042 | Blount | May 28, 1940 |
| 2,592,867 | Cuq | Apr. 15, 1952 |
| 2,688,297 | Livermont | Sept. 7, 1954 |
| 2,744,426 | Lyon | May 8, 1956 |

FOREIGN PATENTS

| | | |
|---|---|---|
| 257,164 | Switzerland | Mar. 16, 1948 |